United States Patent [19]

van der Laarse

[11] Patent Number: 4,593,890
[45] Date of Patent: Jun. 10, 1986

[54] DOUBLE ACTING OLEO PNEUMATIC SHOCK ABSORBER

[76] Inventor: Jan D. van der Laarse, Kievitstraat 10, 2406 Ev Alphen a/d Rijn, Netherlands

[21] Appl. No.: 560,185

[22] Filed: Dec. 12, 1983

[30] Foreign Application Priority Data

Dec. 10, 1982 [NL] Netherlands ............... 8204790

[51] Int. Cl.$^4$ .................. F16F 9/08; F16F 9/342
[52] U.S. Cl. .................. 267/64.25; 188/1.11; 188/322.21; 267/64.22; 267/64.28
[58] Field of Search ............... 267/8 R, 8 A, 64.15, 267/64.18, 64.22, 64.25, 64.26, 64.28, 113, 120, 121; 188/1.11, 284, 285, 289, 298, 313, 322.19, 322.21, 322.22; 244/104 FP

[56] References Cited

U.S. PATENT DOCUMENTS

| | | | |
|---|---|---|---|
| 2,376,678 | 5/1945 | Foster | 267/64.15 X |
| 2,621,924 | 12/1952 | Panhard | 267/64.15 |
| 2,959,410 | 11/1960 | Fullam et al. | 267/64.26 |
| 3,776,605 | 12/1973 | Ruof | 303/100 |
| 3,833,094 | 9/1974 | Grossman | 188/1.11 |
| 3,888,436 | 6/1975 | Sealey | 188/284 X |
| 3,937,526 | 2/1976 | Ruof | 303/100 |

FOREIGN PATENT DOCUMENTS

| | | | |
|---|---|---|---|
| 1154980 | 9/1963 | Fed. Rep. of Germany | 267/64.15 |
| 2252508 | 6/1975 | France | 267/64.15 |
| 2340482 | 9/1977 | France . | |
| 2489458 | 3/1982 | France . | |
| 208855 | 11/1966 | Sweden | 267/64.15 |
| 648931 | 1/1951 | United Kingdom | 267/64.26 |
| 1500714 | 2/1978 | United Kingdom . | |

OTHER PUBLICATIONS

J. van der Laarse, *Landing Gear Shock Absorber Design Criteria and the Assessment of Tire/Wheel Configurations*, based on a lecture presented to the Netherlands Association of Aeronautical Engineers, Oct. 25, 1979.

*Primary Examiner*—Bruce H. Stoner, Jr.
*Assistant Examiner*—Richard R. Diefendorf
*Attorney, Agent, or Firm*—Handal & Morofsky

[57] ABSTRACT

A shock absorber comprising an elongated tubular element, closed at one end, into which element at the other end a piston can move as counter element, is disclosed. The space delimited by the counter element inside the tubular element is divided into a high pressure chamber closed at one end closed by a first movable separating element which can come to rest against a stop element, a fluid chamber divided into at least two sections at the other end, which sections are separated from each other by a restricting element, which fluid chamber is closed by a second movable separating element embodied as a piston, and a low pressure gas chamber positioned between the first and second movable separating elements. During the operation of the shock absorber between the completely expanded position and the completely compressed position during a first motion phase the first separating element is at rest against the stop element and the second separating element is moving in the direction of the first separating element until both separating elements contact each other. Then, during a second motion phase both separating elements are moving together. The first separating element is embodied as a valve body, which, when the valve body is resting and not resting against the stop element realizes no connection and a connection, respectively between the high pressure gas chamber and the low pressure gas chamber.

3 Claims, 7 Drawing Figures

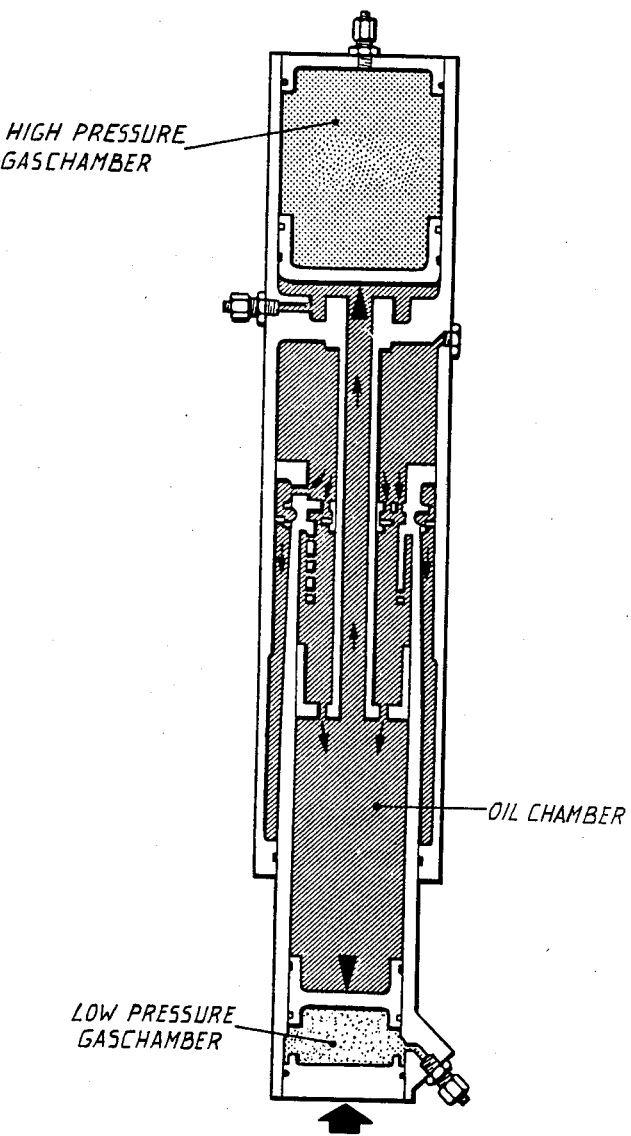

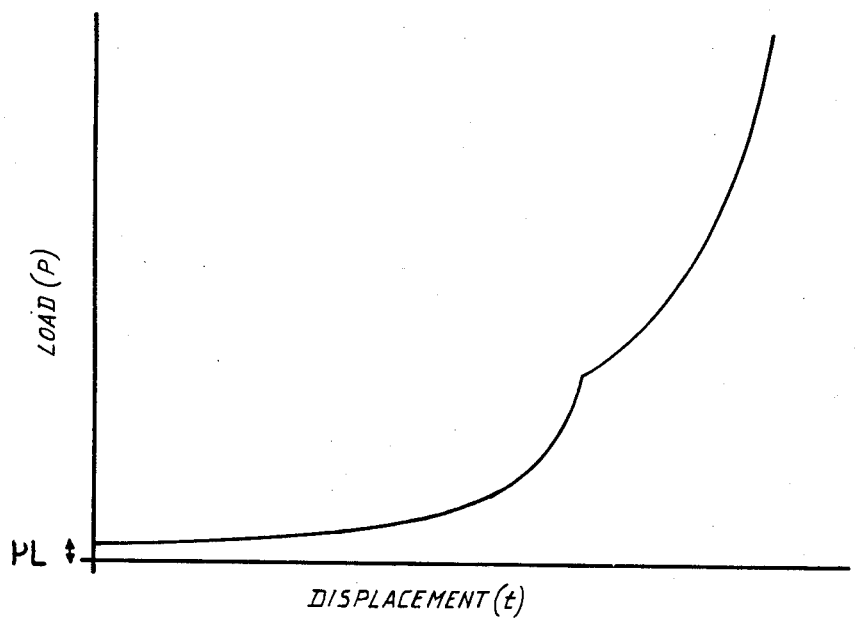

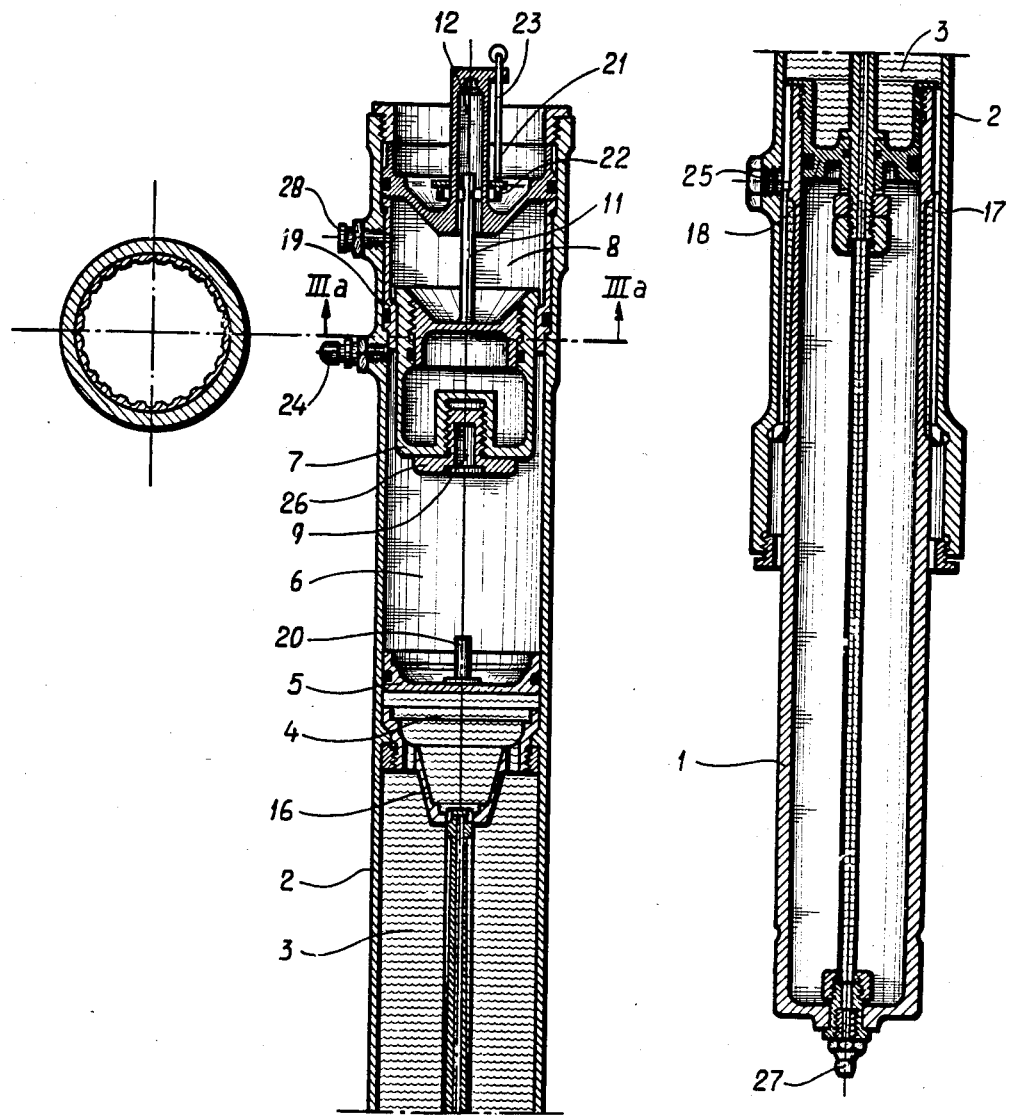

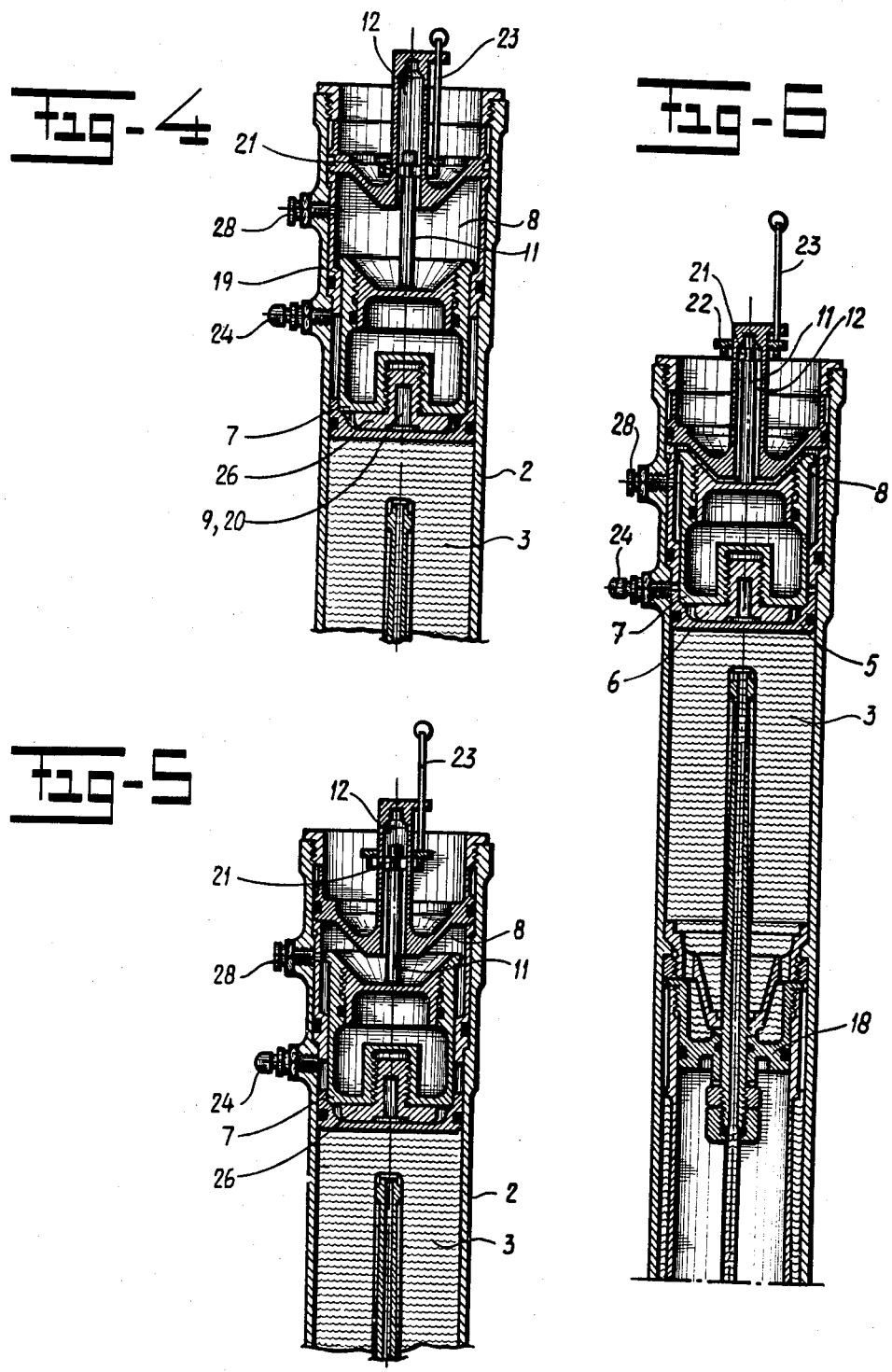

DOUBLE ACTING OLEO PNEUMATIC SHOCK ABSORBER

The invention relates to a double acting shock absorber comprising an elongated tubular element, closed at one end, into which element at the other end a piston can move as counter element, whereby the space delimited by said counter element inside said tubular element is divided into
- a high pressure chamber at the side of said one end, closed by a first movable separating element which can come to rest against a stop element,
- a fluid chamber divided into two sections, which sections are separated from each other by a restricting element, which fluid chamber is at one side closed by a second movable separating element embodied as a piston,
- a low pressure gas chamber.

Such a double acting oleo pneumatic shock absorber, especially intended for use in, respectively aircraft landing gear is described in "Landing gear shock absorber design criteria and the assessment of tire/wheel configuration" by J. D. van der Laarse, which article is based on a lecture presented to the Netherlands Association of Aeronautical Engineers on Oct. 25, 1979.

Over the years the requirements posed upon aircraft landing gear have been significantly increased. The traditional ruling criterion was that a shock absorber in a landing gear should function to receive the actual landing impact. Nowadays however more and more stringent requirements are made to the taxing performance of the aircraft, both to increase comfort as well as safety. Reasons therefor are higher driving speeds, and the fact that the take off and landing strips are not completely level. Also the dynamics of the aircraft when the aircraft is breaking strongly should fulfill certain conditions. Besides the safety and comfort aspects care should be taken to minimize the loads during landing and during taxying movements as far as possible to avoid dangerously high loads on the tires and to restrict metal fatigue phenomena in the landing gear and in further parts of the aircraft construction as far as possible. Further aspects which are playing a role in the design of landing gear and especially in the design of the shock absorbing system thereof are reliability and maintenance, especially the restriction of the maintenance costs.

The double acting oleo-pneumatic shock absorber described in the above mentioned article is meeting said above mentioned criteria in a significant way. The shock absorber comprises two gas chambers, a high pressure gas chamber and a low pressure gas chamber, each at one end of the shock absorber with an oil chamber, divided into two sections, inbetween said above mentioned gas chambers. The oil chamber with the therein present restricting element takes care of the damping of the compressing and expanding movement, whereas the gas chambers take care of the spring performance. A prior art shock absorber is illustrated in FIG. 1, in which the shock absorber is shown in a vertical position because such a position corresponds to the usual operating situation in an aircraft. The figure shows that the oil chamber is separated from the gas chambers by two proper sealing movable pistons. If the shock absorber is gradually compressed from the completely expanded position then first of all the volume of the low pressure gas chamber will decrease and the gas pressure therein will increase. As soon as the pressure is equal to that in the high pressure gas chamber, then during further compression the volume of both gas chambers will decrease.

In FIG. 2 the spring characteristic of such a double acting oleo pneumatic shock absorber is illustrated. The relation between the external axial load (P) of said absorber and the displacement (t) (or the variation in length by expansion or compression) is by choice of the preload (PL), the gas pressure ratios and the complete stroke length determined such that the above mentioned criteria with relation to the statical and dynamical loads on the aircraft during landing, starting, taxying and braking are fulfilled. During the landing of an aircraft, when the aircraft has a downwardly directed speed and the lift of the wing is decreasing because of decreasing air speed caused by braking and the flow around the wing is disturbed by the aerodynamical flaps, then the weight of the aircraft will more and more come to rest on the landing gear. During the resulting compression of the shock absorberr, said shock absorber will act first of all according to the lower section of the characteristic of FIG. 2, and thereafter follow at least partly the upper section of said characteristic. The lower section of said characteristic relates to the low pressure gas chamber whereas in the upper section the spring characteristic is determined by both gas chambers in common.

The disadvantages of this prior art double acting oleo pneumatic shock absorber are mechanical friction and wear. There is a significant chance that gas will leak into oil or oil will leak into gas in the area of both separating pistons and it is very difficult to control the correct amounts of oil and gas. Furthermore each gas chamber has its own gas supplying valve, lengthening the filling procedure and increasing the chance of human error. If the shock absorber by an incorrect fluid filling or incorrect gas pressure is repeatedly compressed to the maximum extent, then not only the structure of the landing gear might become damaged but also damages can appear in other parts of the airplane. A further disadvantage of this prior art construction is that it is not possible for instance on the basis of the position of one of the pistons to derive reliable data concerning a very harsh landing carried out with the airplane.

An object of the invention is now to eliminate the disadvantages of said known construction at least partly.

In agreement with said object, the invention provides a double acting oleo pneumatic shock absorber of the above mentioned type, which absorber according to the invention is characterized in that the fluid chamber is closed at the other side by said counter element acting as piston, and that the low pressure gas chamber is positioned between the first and second movable separating elements. This absorber according to the invention comprises only one movable piston element taking care of the separation between oil and gas. This is in contrast to the prior art system in which two piston elements are taking care of the sealing function between oil and gas.

In a preferred embodiment of a shock absorber according to the invention the pressure and the volume of the high gas chamber and the low pressure gas chamber are selected such that during the operation of said shock absorber between the completely expanded position and the completely compressed position during a first motion phase the first separating element is at rest against the stop element and the second separating element is moving in the direction of said first separating element until both separating elements contact each other. Then during a second motion phase both separating elements are moving together. In an embodiment of this type the transition point between the first motion phase and the second motion phase and therewith the position of the various parts of the shock absorber at that moment is clearly defined because at the transition point both movable separating elements are becoming coupled or decoupled respectively. In the first motion phase the first separating element is resting against the stop column and only the second separating element is moving. During the second motion phase both separating elements are moving together in coupled condition.

A further embodiment of the invention is characterized in that the first separating element is embodied as a valve body, which, when the valve body is resting or not resting against said stop element realises no connection or a connection, respectively, between the high pressure gas chamber and the low pressure gas chamber because of the valve function of the first separating element. A connection is created during the second motion phase between the high pressure gas chamber and the low pressure gas chamber with the result that the pressure in both gas chambers is equal under all circumstances during the second motion phase. If the absorber is expanding and the valve/piston combination will move downwards until the valve body comes to rest against the stop element. Thereafter the piston element will be released from said valve body and will move further downwards thereby decreasing the pressure in the low pressure gas chamber. During the compressing movement the piston element will move into the direction of the valve body resting against the stop element and at the moment the pressure in both gas chambers is equal or nearly equal both elements will be coupled.

Further embodiments of the invention as well as the advantages related thereto will be described in the following description with reference to the attached drawings. In this embodiment it is not necessary that the valve body is sealing against the tubular wall, the only necessary sealing is between the valve body and the stop element functioning as valve seat.

FIG. 1 illustrates the prior art shock absorber.

FIG. 2 illustrates the spring diagram of a double acting oleo pneumatic shock absorber.

FIG. 3a illustrates a shock absorber according to the invention in the completely expanded condition.

FIG. 3b illustrates a cross section through the shock absorber of FIG. 3a according to line IIIa—IIIa.

FIG. 4 illustrates a part of the shock absorber of FIG. 1 at the moment the piston element and the valve body are coupled.

FIG. 5 illustrates a part of the shock absorber of FIG. 1 in the second motion phase.

FIG. 6 illustrates the shock absorber of FIG. 1 in the completely compressed condition.

The shock absorber illustrated in FIG. 3a comprises a tubular element 2 closed at the upper side, into which tubular element a counter element 1 embodied as a piston can move from the under side. The valve body 7 and the piston element 5 are furthermore positioned within said tubular element 2. An oil chamber 3, 4 is positioned inbetween said piston shaped counter element 1 and the piston element 5. A low pressure gas chamber 6 is present between the piston element 5 and the valve body 7 and the high pressure gas chamber 8 is present between the valve body 7 and the upper side of the tubular housing 2. The oil chamber 3, 4 is separated in two sections 3 and 4 by means of a restricting plate 16 having narrow orifices. In the completely expanded condition the sealing element 18, permanently coupled to the counter element pressed at the under side of the oil chamber against the stop column 17 at the inner wall of the tubular housing 2 and the valve body 7, rests closingly against the stop collar 19 at the inner wall of the tubular housing 2. A gas fill nipple 24 is installed into the upper part of the housing and an oil fill nipple 25 is installed at a lower level. The system, of which the high pressure chamber 8, the low pressure chamber 6, the valve body 7 and the piston element 5 are forming the characteristic parts, can also be assembled into a separate subunit with a separate wall 2'. Such a subunit can be installed as a whole within the wall 2. This alternative is important for modernising an existing shock absorber by means of the system according to the invention. The invention is therefore not restricted to new shock absorbers. Older types comprising one gas chamber or two gas chambers can be improved by means of such a subassembly.

Compressing the absorber from the completely expanded condition, which as a rule will take place during an aircraft landing, will result into an upward movement of the counter element 1 and as a result of the oil motion in the oil chamber 3, 4 also the piston element 5 will move upwards over a corresponding distance. The motion speed is dependent upon the sizes of the orifices in the restriction plate 16, through which the fluid has to flow from the lower oil chamber section 3 to the upper oil chamber section 4. Because of the upwardly moving piston element 5, the pressure in the low pressure chamber 6 will be increased. The spring performance of the shock absorber is now determined by the lower section of the curve in FIG. 2. At the moment the pressure in the low pressure chamber is equal or nearly equal to the pressure in the high pressure chamber, the piston element 5 will make contact with the valve body 7. The piston element 5 comprises an extending pin 20 which during the coupling motion of the piston element and the valve body will be inserted into an excavation 9 in the valve body. Dependent on the fit of the pin 20 into the excavation 9 the speed at which the piston element makes contact with the valve body can be damped. It is furthermore important that the coupling between the piston element and the valve body will prevent an eventual tilting of the valve body 7 in relation to the seat 19.

If the shock absorber is further compressed then the valve body 7 will be lifted from the seat 19. Because said valve body 7 does not realize a gas tight sealing with the tubular wall a connection is now created between the high pressure gas chamber and the low pressure gas chamber 6 and from that moment the gas in both gas chambers is further compressed. To realise a proper connection directly after the valve body is released from the seat preferably a number of grooves are made at least into the upper section of the valve body wall, which grooves in this condition are functioning as leakage channels, see FIG. 3b. The spring performance of the shock absorber is now determined by the upper section of the curve in FIG. 2. The pin 11 on the valve body 7, which at the upper side of the high pressure gas chamber 8 moves into the channel 12 has a function which will be explained in more detail hereinafter and functions furthermore to maintain the moving valve body 7 in the correct position. The coupling between the valve body 7 and the piston element 5 is maintained until, when the shock absorber is expanding, which will happen in the last motion phase of the start of an aircraft, when the load of the aircraft unto the landing gear is decreasing, the pressure in the oil chamber 3, 4 and therewith also the pressure in the high pressure gas chamber 8 decreases. During this expansion the volume of the high pressure gas chamber will increase until the valve body 7 comes to rest onto seat 19. At that moment the separate high pressure gas chamber 8 is created again, into which high pressure gas chamber the gas pressure is maintained also if the absorber expands further. The piston element 5 will become separated from the valve body 7 under the influence of the pressure difference between the gas enclosed into the space between the valve body and the piston element and the oil. Preferably means are present, for instance mechanical, magnetical or other type of means to realise a certain adherence between the valve body 7 and the piston element 5. As example in FIG. 3a a little magnet 26 is indicated near the underside of the excavation 9, which magnet will try to hold the pin 20. Because of the resulting adherence the piston element 5 will not directly react to appearing pressure differences between the enclosed gas and the oil and will therefor not directly become released from the valve body 7. The result thereof is that during the backwards movement the valve body will with a certain force become pressed onto the seat. Furthermore, it is thereby prevented that the valve body will bounce or float onto the seat 19 if the pressure at body sides of the valve body/piston element combination is equal. Furthermore, in case the static load or in other words when the standard weight of the aircraft rests on the landing gear said adherence functions to assure that when measuring the oil level in the shock absorber the upper limit of the oil chamber and therewith the oil volume is defined. After release of the piston element 5 from the valve body 7 caused by a sufficient pressure difference to cause separation between the piston element 5 and the valve body 7 again a separate low pressure gas chamber is created when the oil pressure is further reduced. Said gas chamber is filled with gas which was, as already said, enclosed within the space between the valve body 7 and the piston element 5.

The oil level in the loaded shock absorber is determined using means at the upper side of the high pressure gas chamber. At the upper side of the piston element 7 the already mentioned pin 11 is positioned, which during compression will move into the channel 12 connected at the upper side to the high pressure gas chamber 8. At the upper side of the pin 11 a magnet 21 is installed which cooperates with a magnetic ring 22 positioned around the exterior of the channel 12. By moving the pin 11 and therewith the magnet 21 into the channel 12 the magnetic ring 22 will be displaced and from the location of said ring respectively from the position of the therewith coupled indicating rod 23 and from the total length of the compended shock absorber one can draw conclusions about the amount of oil in the shock absorber. By means of this system it is possible also to connect data about the nature of the landing carried out with the aircraft, especially about very harsh landings. The present situation is that a pilot reports a rough landing or not based on his own instinctive observation. After a report a so called harsh landing inspection should be carried out onto the landing gear and the aircraft. In most cases no damages are found. The reason thereforis that the average descent speed of aircrafts amounts to 60–90 cm/sec whereas a descent speed of approximately 300 cm/sec is still allowed. A landing of 180–210 cm/sec might be observed by a pilot as limit exceeding with the result that the pilot will report that landing. Within the scope of the invention more accurate measuring systems than the pure magnetic systems are preferred by means of stroke indication means which can be for instance coupled to an electronic measuring system through an LVDT, a so called linear variable differential transformer, it is possible to determine more accurately the "harshness" of a landing on the basis of the maximum recorded stroke of the shock absorber and it is furthermore possible to collect statistical data about the landing impacts in general. The above mentioned LVDT can be switched over from a landing measuring condition into an oil level measuring condition.

Furthermore the construction of the pin 11 and the channel 12 may be different from the embodiment indicated in FIGS. 3–6 and discussed above. To restrict the total length of the shock absorber the pin 11 might form an integral part of the closing cover of the high pressure chamber and move into a chamber 12 to the valve body 7. The measuring system can be adapted to this situation.

Filling the oil chamber and the gas chambers with fluid and gas, respectively is done as follows. First of all the gas in the gas chambers 6 and 8 is vented through the valve 28 so that the shock absorber will collapse completely if the aircraft weight is resting thereon or can be compressed completely under the influence of an external force if auxiliary means are used to support the aircraft. Thereafter the oil is supplied to the chambers 3 and 4 through the nipple 25 until airfree oil runs out of the oil leakage valve. Said oil leakage valve which is in the figure indicated by 27 is closed thereafter and further oil is supplied until the piston valve 5 has reached the highest level and adheres under the influence of the oil pressure to the valve body 7. Therafter the gas chambers 6 and 8 will be filled using the nipple 24. If the landing gear actually carries the aircraft the gas pressure is increased until the standard condition of the shock absorber, corresponding to the standard aircraft weight and the position of the point of gravity is reached. If the aircraft is supported in another way (the aircraft is for instance placed on lifting jacks) then the gas pressure is increased until a predefined value is reached.

Although in the above description especially the use of the shock absorber according to the invention in aircraft landing gears is discussed, such a shock absorber can also be used for other purposes. A possible application is in vehicles, especially vehicles destined to drive over heavy and accidental terrain or vehicles which have to withstand a parachute landing. Furthermore the shock absorber according to the invention can be used for dumping the recall in gun systems.

Besides these other application possibilities it will be clear that several variations and adaptions of the illustrated embodiment are possible without falling outside the scope of the invention.

I claim:
1. A shock absorber comprising:
   (a) an elongated tubular element, said elongated tubular element being closed at one end, and

(b) a piston disposed in said elongated tubular element at the other end, said piston being configured and dimensioned to move in said tubular element, said piston defining a space inside said elongated tubular element, said space being divided into:
  (i) a high pressure chamber defined at one and of said space closed by a first movable separating element;
  (ii) a stop element against which said first movable separating element can come to rest;
  (iii) a fluid chamber at the other end of said space divided into at least two sections;
  (iv) a restricting element for separating said fluid chamber into said two sections;
  (v) a second movable separating element functioning as a piston for closing said fluid chamber; and
  (vi) a low pressure gas chamber positioned between the first and second movable separating elements, said shock absorber operating between a completely expanded position and a completely compressed position; said first separating element being configured to be at rest against said stop element thereby completely closing the high pressure gas chamber and said second separating element being configured to move during a first motion phase in a direction toward said first separating element until both separating elements contact each other, both separating elements being configured and dimensioned to move together during a second motion phase, the first movable separating element thereby leaving said stop element and further being configured to provide a connection between said high pressure gas chamber and said low pressure gas chamber during the transition from the first to the second motion phase, and further comprising only one valve to supply gas to said high and low pressure chambers, said first movable separating element comprising means for operating an external deflection indicating means.

2. A shock absorber, comprising:
(a) an elongated tubular element, said elongated tubular element being closed at one end, and
(b) a piston disposed in said elongated tubular element at the other end, said piston defining a space inside said elongated tubular element, said space being divided into
  (i) a high pressure chamber defined at one end of said space by a first movable separating element;
  (ii) a stop element against which said first movable separating element can come to rest;
  (iii) a fluid chamber at the other end of said space divided into at least two sections;
  (iv) a restricting element secured to said tubular element for separating said fluid chamber into said two sections;
  (v) a second movable separating element being a piston for closing said fluid chamber;
  (vi) a low pressure gas chamber positioned between the first and second movable separting elements, said shock absorber operating between a completely expanded position and a completely compressed position; said first separating element being configured to be at rest against said stop element and said second separating element being configured to move during a first motion phase in a direction toward said first separating element until both separating elements contact each other; both separating elements being configured and dimensioned to move together during a second motion phase, the first movable separating element thereby leaving said stop element aand further being configured to provide a connection between said high pressure gas chamber and said low pressure gas chamber when said first movable separating element is removed from contact with said stop element, wherein, said first movable separating element comprises means for operating an external deflection indicating means.

3. A shock absorber, comprising:
(a) an elongated tubular element, said elongated tubular element being closed at one end, and
(b) a piston disposed in said elongated tubular element at the other end, said piston being configured and dimensioned to move within said tubular element, said piston defining a space inside said elongated tubular element, said space being divided into:
  (i) a high pressure chamber defined at one end of said space closed by a first movable separating element;
  (ii) a stop element against which said first movable separating element can come to rest;
  (iii) a fluid chamber at the other end of said space divided into at least two sections;
  (iv) a restricting element for separating said fluid chamber into said two sections;
  (v) a second movable separating element functioning as a piston for closing said fluid chamber; and
  (vi) a low pressure gas chamber positioned between the first and second movable separating elements, said shock absorber operating between a completely expanded position and a completely compressed position; said first separating element being configured to be at rest against said stop element thereby completely closing the high pressure gas chamber and said second separating element being configured to move during a first motion phase in a direction toward said first separating element until both separating elements contact each other, both separating elements being configured and dimensioned to move together during a second motion phase, the first movable separating element thereby leaving said stop element and further being configured to provide a connection between said high pressure gas chamber and said low pressure gas chamber during the transition from said first to said second motion phase, said first movable separating element and said second movable separating element comprising coupling means which in the transition between the first and the second motion phases become coupled and decoupled, the second movable separating element comprising a pin extending in the direction of the first movable separating element and the first movable separating element comprising a correspondingly shaped mating hole open in the direction of said second movable separating element, said pin being inserted in the correspondingly shaped mating hole during said second motion phase.

* * * * *

UNITED STATES PATENT AND TRADEMARK OFFICE
CERTIFICATE OF CORRECTION

PATENT NO. : 4,593,890

DATED : June 10, 1986

INVENTOR(S) : Van Der Laarse

It is certified that error appears in the above-identified patent and that said Letters Patent is hereby corrected as shown below:

On the title page add:

Item /73/ -- Fokker, B.V. a Corp. of the Netherlands, Schiphol, Netherlands --.

Signed and Sealed this

Twenty-first Day of October, 1986

[SEAL]

*Attest:*

DONALD J. QUIGG

*Attesting Officer*      *Commissioner of Patents and Trademarks*